Oct. 19, 1965   K. E. REISCHL   3,212,593
PIPE-HANDLING APPARATUS
Filed Feb. 7, 1963   5 Sheets-Sheet 1

INVENTOR:
KARL E. REISCHL
BY
Robert E. Howe
ATTORNEY

Oct. 19, 1965   K. E. REISCHL   3,212,593
PIPE-HANDLING APPARATUS
Filed Feb. 7, 1963   5 Sheets-Sheet 4

INVENTOR:
KARL E. REISCHL
BY Robert E. Horne
ATTORNEY

Oct. 19, 1965     K. E. REISCHL     3,212,593

PIPE-HANDLING APPARATUS

Filed Feb. 7, 1963     5 Sheets-Sheet 5

INVENTOR:
KARL E. REISCHL
BY Robert E. Horne
ATTORNEY

United States Patent Office 3,212,593
Patented Oct. 19, 1965

1

3,212,593
PIPE-HANDLING APPARATUS
Karl E. Reischl, South Milwaukee, Wis., assignor to Bucyrus-Erie Company, South Milwaukee, Wis., a corporation of Delaware
Filed Feb. 7, 1963, Ser. No. 256,974
5 Claims. (Cl. 175—85)

This invention relates to apparatus for handling pipe and more particularly to apparatus for handling drill pipe in a rotary blast-hole drilling machine.

It is common practice to provide for the storage of additional lengths of drill pipe on a drilling machine. Such pipe storage enables the drilling machine to drill holes to various depths depending on the number of additional pipes added to form a drill string during drilling. An example of a prior art drill pipe storage and handling means for a rotary blast-hole drilling machine is shown in Thornburg U.S. Patents No. 2,863,638; 2,869,826; and 2,972,399.

In the present invention pipe handling apparatus is provided which allows the storage of one or more drill pipes on the mast or derrick of a rotary drilling machine, and in addition, the pipe handling apparatus allows a selected drill pipe to be moved from storage position on the mast to a drill pipe attachment position in alignment with the axis of a drill hole.

In the preferred embodiment, a plurality of drill pipes are stored in the pipe handling apparatus in the drill mast. Each drill pipe is stored in an individual pipe handling means which can be positioned to bring a selected drill pipe in alignment with the drill hole axis. Further, the drill pipe handling apparatus provides for pipe handling when the mast is vertically positioned relative to the machine or when the mast is tilted from the vertical for angle drilling.

Primarily, the pipe handling apparatus consists of individual pipe racks each having a lower pipe rack socket, and an upper pipe rack clamping means. The pipe racks are each pivotally mounted on the drilling machine, and are each powered to move an individual pipe rack to a drill pipe attachment position from a drill pipe storage position and vice versa so that the pipe is substantially parallel to the mast at the drill pipe attachment position.

In the preferred embodiment, a drill pipe is carried in each pipe rack with the racks arranged in the mast so that a selected drill pipe is carried from the storage position to the drill pipe attachment position in which the drill pipe is aligned with the drill hole axis.

When the drill pipe carried by a selected pipe rack has been moved to drill pipe attachment position, the drill pipe is removed from the rack by longitudinally positioning the rotary drive means on the mast to engage and couple with the drill pipe. The rack is then moved to storage position when the pipe has been withdrawn from the rack. The rotary drive means moves longitudinally of the drill mast and is lowerable to engage and couple with the upper portion of the drill pipe when aligned with the drill hole axis. The drill pipe is then lifted by the rotary drive means sufficiently to allow the pipe rack to be returned to storage position. The rotary drive means then lowers the drill pipe for attachment to a drill collar or drill bit or other drill pipe at the drilling axis. By repeating the above sequence with each pipe rack carrying a drill pipe, a drill string is formed to drill a hole of a desired depth.

The pipe handling apparatus of this invention readily handles the long heavy lengths of pipe to make up complete drill strings. The pipe handling apparatus is also effective in removing drill pipe from a drill string and returning the drill pipes to storage in the mast of the drilling machine. All such pipe handling may be performed by an operator remotely located from the pipe handling apparatus as will be apparent as the description progresses.

In addition to storing a plurality of drill pipes in a mast and positioning the drill pipes for vertical drilling, the same pipe handling apparatus handles and stores the drill pipe effectively when the mast is tilted at an angle from the vertical for angle drilling.

It is therefore an object of this invention to provide an improved pipe handling apparatus for positioning drill pipe from a storage position to a drill attachment position in substantial alignment with the axis of a drill hole.

It is another object of this invention to provide a pipe handling attachment for a plurality of pipes for individually positioning within a drill mast a selected drill pipe from storage position to a drill attachment position.

It is a further object of this invention to provide a means for positioning a drill pipe from a storage position on the mast to a drill attachment position in alignment with a drilling axis.

It is another object of this invention to provide means on the drill mast for positioning selectively one of a plurality of drill pipes from a storage position in said mast rearwardly of the drill hole axis to a drill attachment position in alignment with the drill hole axis.

It is another object of this invention to provide for the storage of drill pipes within a drill mast and intermediate the drill hole axis and the center of gravity of the machine.

It is a further object of this invention to provide a pipe handling means which effectively stores and positions drill pipe for both vertical and angle drilling.

In addition to the objects stated hereinabove, a number of novel and useful details have been worked out which will be readily apparent hereunder.

The invention consists of the novel parts and the combination and arrangements thereof which are defined in the appended claims, and of which, one embodiment is exemplified in the accompanying drawings, of which:

FIGURE 6 is an enlarged plan view taken along line 6—6 of FIGURES 1 and 2;

FIGURE 7 is an enlarged elevation of the pipe handling apparatus of FIGURE 4;

Figure 1:
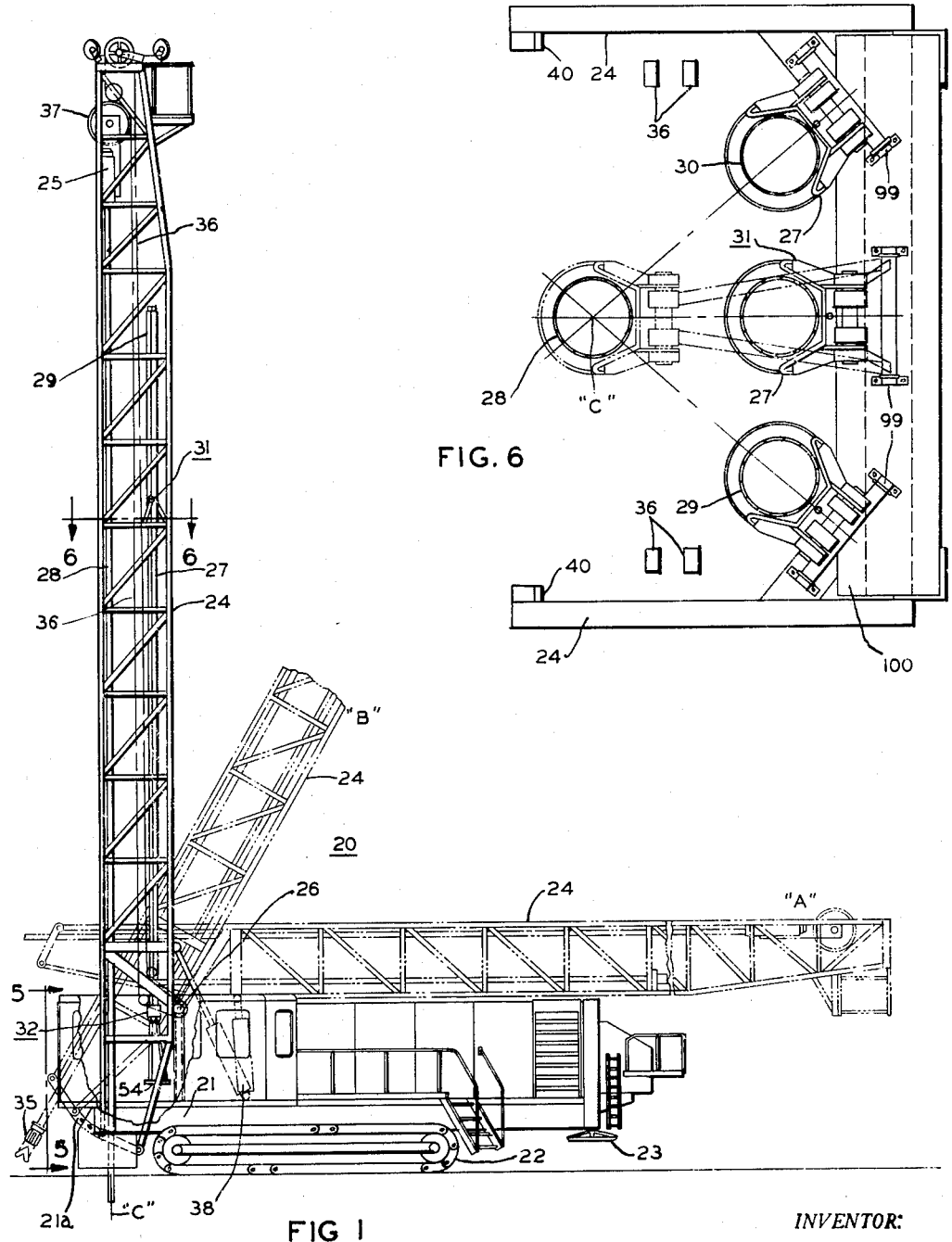
FIGURE 1 is a side elevation of a rotary blast-hole drilling machine embodying the invention.

Referring now to FIGURE 1, a rotary blast-hole drilling machine is designated generally as 20. Drilling machine 20 comprises a main frame 21 mounted on a set of crawlers 22, and a mast 24 which is pivotally attached to the main frame as at pivot 26. A hydraulic cylinder 38 pivotally attached to frame 21 and to mast 24 provides a means for raising and lowering the mast and for maintaining mast positions between the vertical axis of the mast and the horizontal. For example, in position "A" the mast is in horizontal or traveling position, and in position "B" the mast is at an angle to the horizontal for angle drilling.

Mounted for longitudinal movement along the mast is rotary drive means 25. A chain 36 driven by a power means (not shown) drives a sprocket 37 on the rotary drive means 25 to turn a pinion 39 engageable in rack 40 (FIGURE 2) to move the rotary drive means along the mast when it is desired to raise or lower the rotary drive means.

Figure 4:
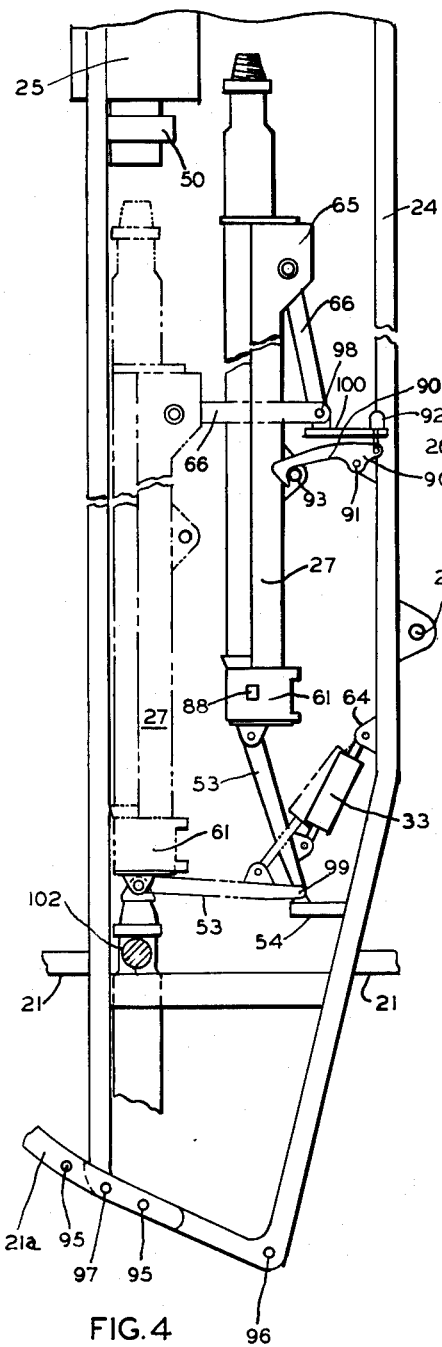
FIGURE 4 is an elevation taken along line 4—4 of FIGURE 3.
Figure 5:
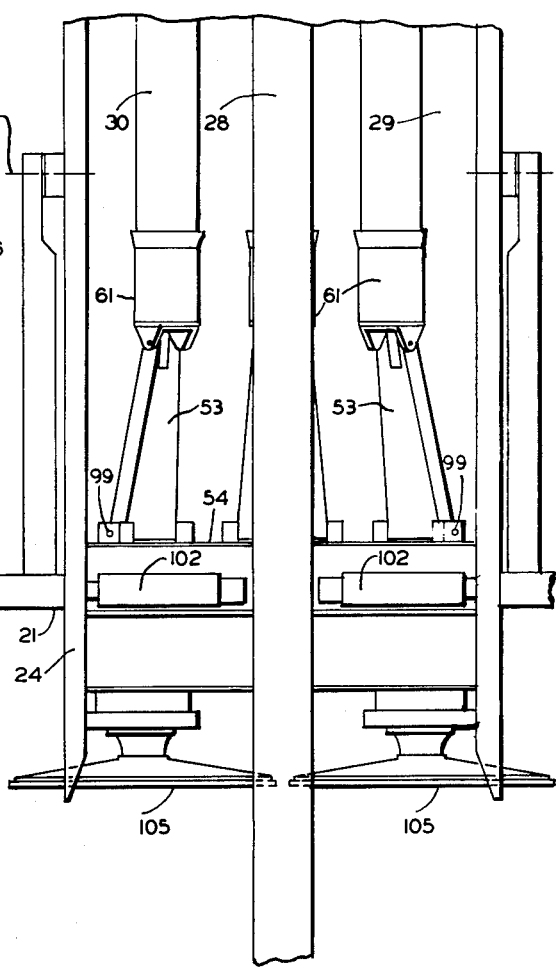
FIGURE 5 is an enlarged front elevation of the pipe handling apparatus taken along line 5—5 of FIGURE 1.

In the preferred embodiment of the drilling machine 20, provision is made for the storage of three drill pipes 28, 29, and 30 (FIGURES 1 and 2) within the mast 24. The drill pipes are each stored in a pipe rack 27. At the upper end of the pipe rack 27 is an upper pipe rack pivot assembly 31 consisting of upper pipe rack portion 65, arm 66, and pin 52 (FIGURES 4 and 7), and at the lower end of the pipe rack 27 is a lower pipe rack pivot assembly 32 consisting of pipe rack socket 60, arm 53, and pin 51 (FIGURES 4 and 7). Only one pipe rack and upper and lower pipe rack pivot assembly will be described inasmuch as the three pipe racks 27 are identical and differ only in their location within the mast 24.

Figure 2:
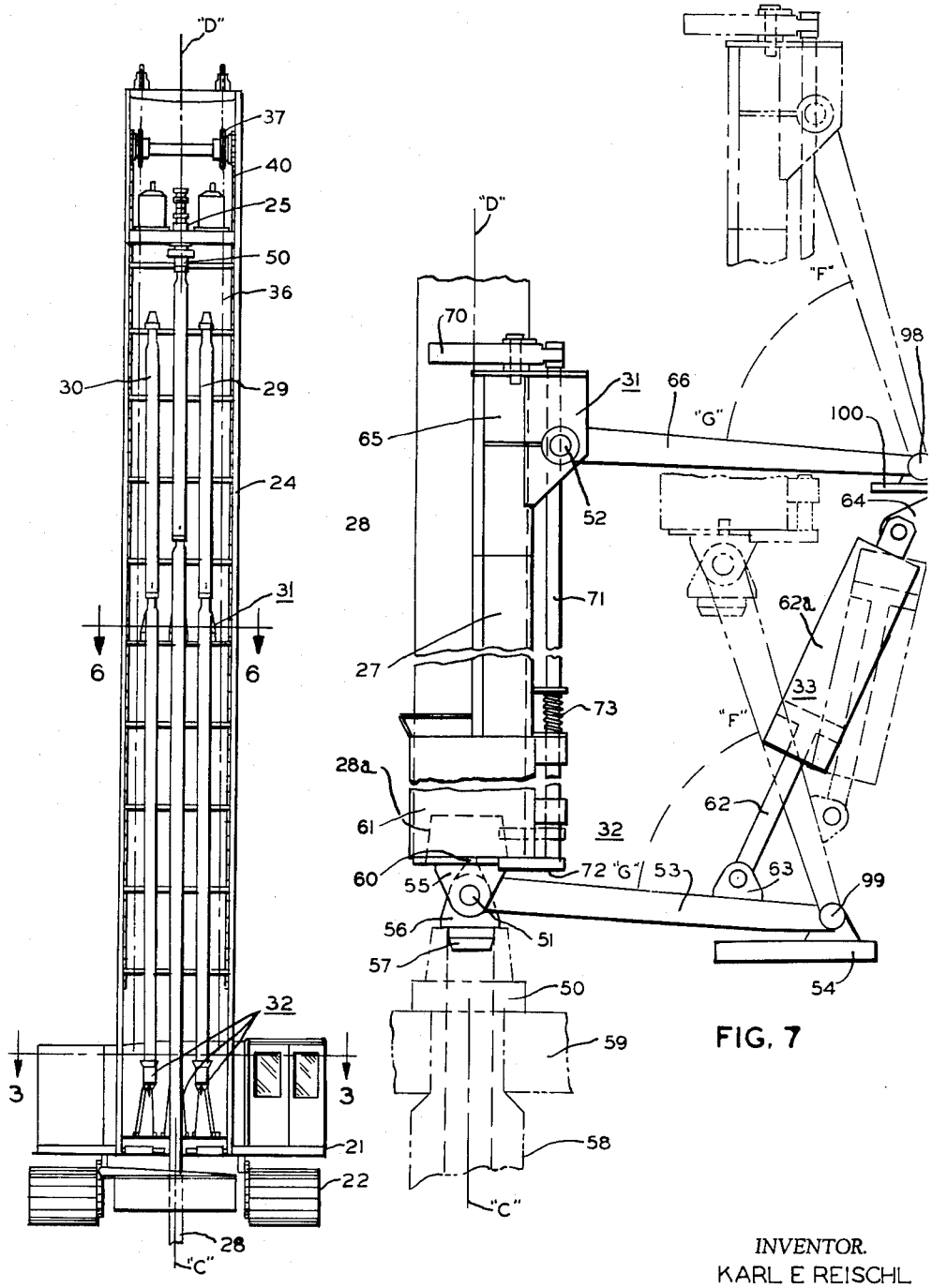
FIGURE 2 is a front elevation of the drilling machine of FIGURE 1.

In FIGURES 1 and 2, a drill pipe 28 is shown as driveably engaged with rotary drive means 25 at coupling 50 for drilling a hole while drill pipes 29 and 30 are shown in pipe racks 27 in a storage position within the mast 24.

The upper and lower pipe rack pivot assemblies 31 and 32 are pivotally attached to the mast 24 as at pins 98 and 99, and are pivotally moved from a storage position "F" (FIGURES 4 and 7) in the mast to a drill attachment position "G" within the mast. A fluid pressure ram means 33 (FIGURES 4 and 7) is pivotally attached at lug 64 to the mast 24 and to the lower pipe rack pivot assembly 32 at lug 63 on arm 53 for raising and lowering the pipe rack 27.

Figure 3:
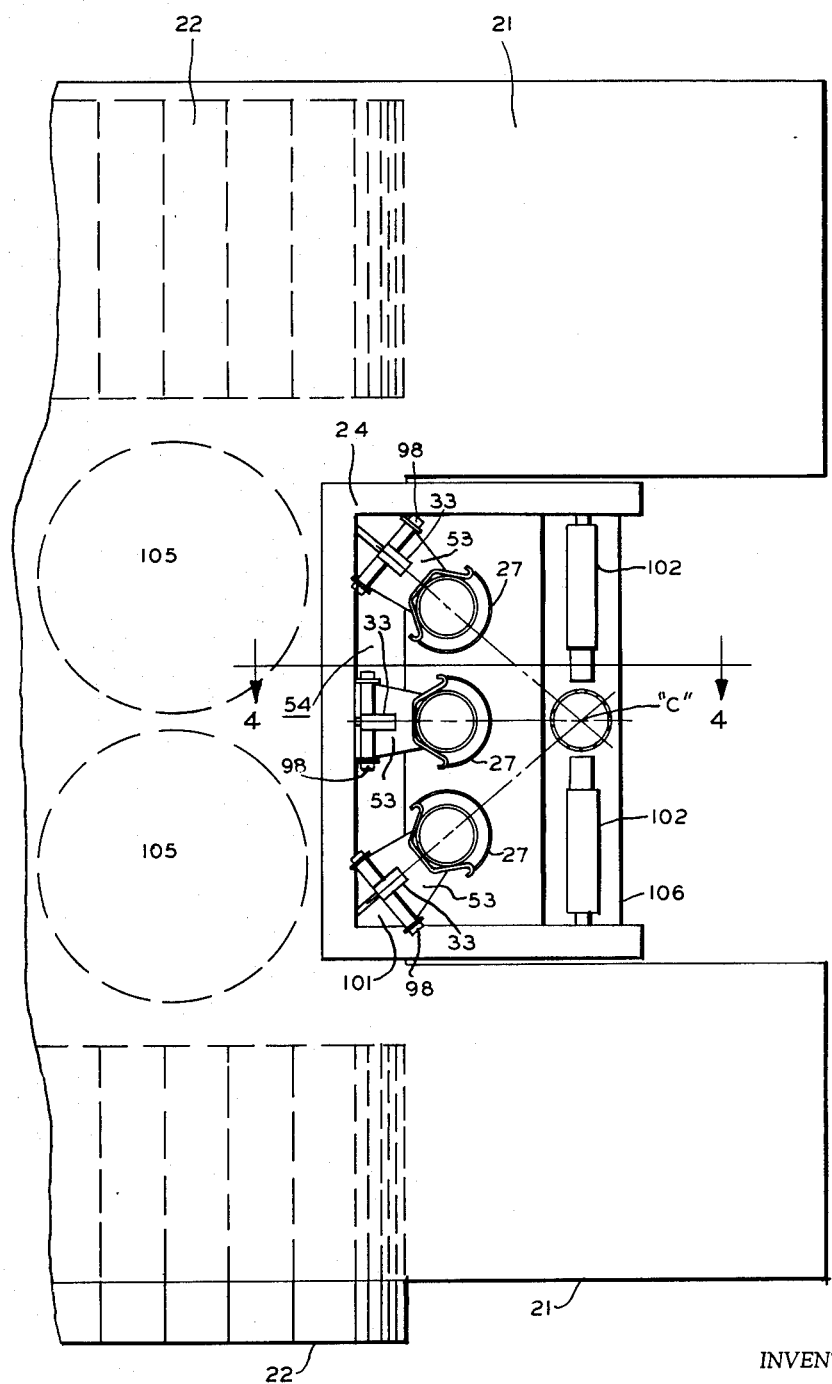
FIGURE 3 is an enlarged plan view of pipe handling apparatus taken along line 3—3 of FIGURE 2.

Referring to FIGURES 3 and 6, each of pipe racks 27 is pivotally mounted on support plates 100 and 54 by arms 66 and 53 to move the racks from a storage position in the mast to a drill attachment position in alignment with the axis "C" of a drill hole. In this manner, a pipe 28 in its rack 27 may be positioned from storage position to drill attachment position, or pipes 29 and 30 in their racks may each be similarly positioned by a fluid pressure ram means 3 pivotally attached to its arm 53.

In FIGURE 3, a plan view reveals the arrangement of the pipe handling apparatus in the mast 24 with the pipe racks in storage position, and which when lowered align with the drilling axis "C."

Forward jacks 105 for levelling machine 20 in conjunction with rear jacks 23 (FIGURE 1) are located adjacent the forward end of the crawlers 22 so that the drilling is at axis "C" forwardly of all jacks and crawlers. A conventional hydraulic wrench 102 is mounted on a drill floor 106 attached to the mast 24 and movable therewith, to provide a means for engaging a drill collar or drill pipe during the making or breaking of a drill string.

Referring now to FIGURE 7 wherein upper and lower pipe rack arms 66 and 53 of pivot assemblies 31 and 32, respectively, are shown pivotally attached to a pipe rack 27 at pivot pins 52 and 51. Arm 53 is pivotally carried on a base 54, secured to mast 24 (FIGURE 4). Arm 53 is also pivotally attached at its outer end to rack lug 55 by pin 51. Also pivoted on arm 53 is guide means 56 which is provided with reduced portion 57 for nesting in a drill pipe 58 (shown dotted) secured by hydraulic wrenches 102 mounted on the mast. By nesting guide means 56 in a drill pipe 58 when the pipe rack and pipe are on the drilling axis, the combined weight of the pipe rack and pipe carried therein is borne by the supported drill pipe 58 rather than by arm 53 and fluid pressure ram means 33. An upper pin 60 of guide means 56 is insertable in the pipe rack socket 61 to maintain guide means 56 in alignment with the axis of a drill pipe carried by the pipe rack 27 as the arm 53 moves from storage position to drill attachment position.

A double-acting fluid pressure ram means 33 is pivoted at one end to lug 63 on arm 53 and at the other end to lug 64. The ram means 33 moves arm 53 from storage position "F" to drill attachment position "G" and vice versa.

The upper arm 66 pivots at pin 52 when the rack 27 is positioned by the fluid pressure ram means 33 acting on arm 53. In this manner, a parallelogram linkage is formed of the mast 24, pipe rack 27, and arms 53 and 66.

Figures 9, 10:
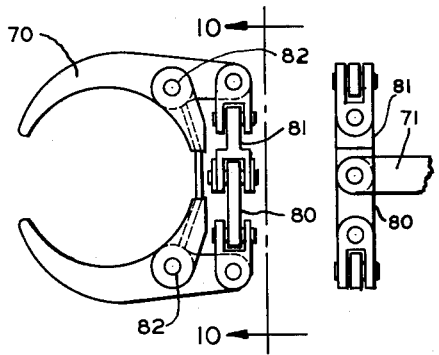
FIGURE 9 is a reduced plan view along the line 9—9 of FIGURE 8.
FIGURE 10 is an end view taken along line 10—10 of FIGURE 9.
Figures 11, 12:
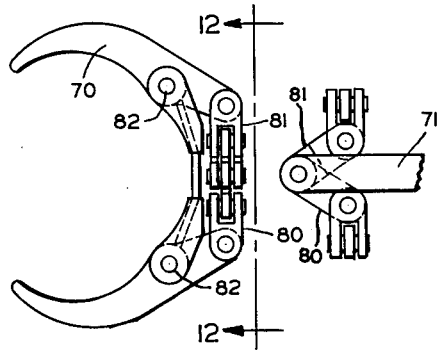
FIGURE 11 is a plan view of the clamp of FIGURE 9 in an open position.
FIGURE 12 is an end view taken along line 12—12 of FIGURE 11.
Figure 8:
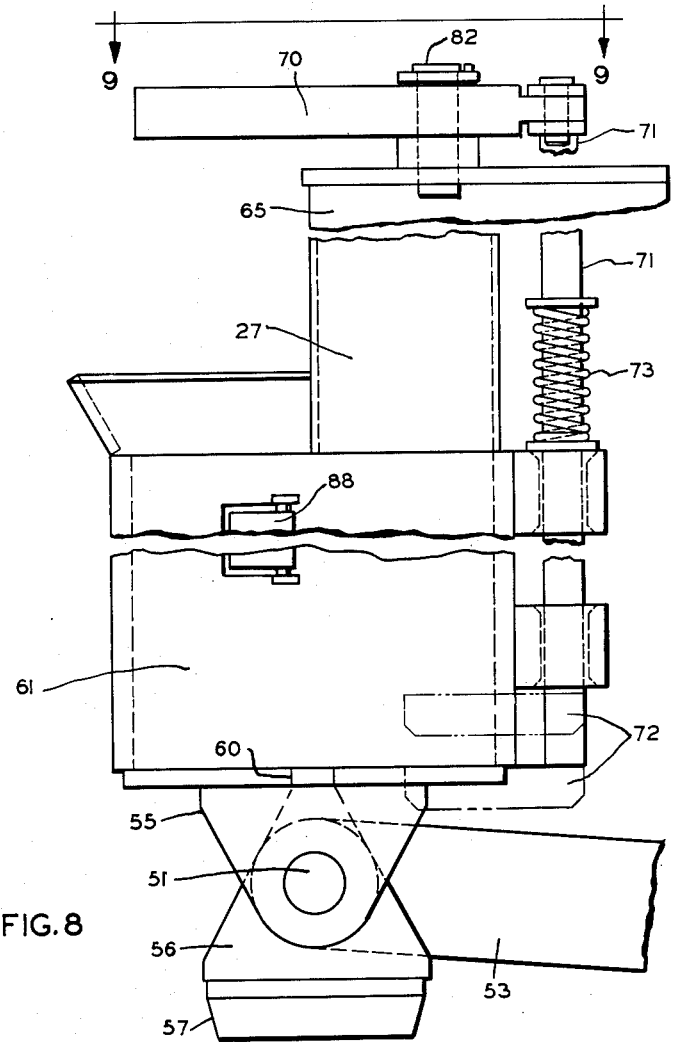
FIGURE 8 is an enlarged elevation of the pipe rack and clamping means of FIGURE 7.

Referring now to FIGURES 7 and 8 through 12, a pipe clamp means 70 is mounted for opening and closing and engaging pipe 27 at the upper pipe rack portion 65 and is actuated by a rod 71. Rod 71 is provided with a drill pipe contact member 72 located at the lower end of rack 27 inside pipe rack socket 61. Insertion of a drill pipe in socket 61 engages dog 88 and the drill pipe forces member 72 downwardly to move the rod 71 downwardly thereby compressing spring 73 and closing clamp 70. When the drill pipe is removed from the rack 27, spring 73 returns the rod 71 to its initial position to open clamp 70. The opening and closing of clamp 70 can be seen in FIGURES 8 to 12, wherein FIGURES 9 and 10 show the clamp 70 in a closed position, and FIGURES 11 and 12 show the clamp 70 in an open position. Rod 71 is pivotally attached to linkages 80 and 81. When the linkages are in alignment or toggle as in FIGURE 10, the clamp 70 is in a closed position. As the rod 71 moves upwardly by action of spring 73, linkages 80 and 81 move upwardly to move clamp 70 about clamp pivots 83 to open clamp 70 (FIGURES 11 and 12). With the rod 71 normally in an "up" position (FIGURES 8, 11, and 12), the clamp 70 is normally open so that a drill pipe may be readily received in rack 27. When a drill pipe is inserted in rack 27 the weight of the drill pipe moves rod 71 downwardly to close clamp 70 (FIGURES 7, 9, and 10) with linkages 80 and 81 in toggle, to retain the drill pipe within the rack. The dogs 88 are of known construction and operation and are shown and described in U.S. Patent No. 2,972,388, issued February 21, 1961, to H. W. Thornburg, for "Well Drill Pipe-Handling Apparatus." The dogs 88 perform the function of preventing rotation of the drill pipe when the rotary drive means 25 is rotated to disengage the drill pipe.

When the rotary drive means 25 (FIGURE 1) engages and couples with the drill pipe and lifts it upwardly from rack 27, the clamp 70 opens by action of spring 73 returning rod 71 to open position (FIGURE 11). The pipe rack 27 is then swung to storage position by fluid pressure means 33 after the drill pipe has been raised to clear rack socket 61.

In FIGURE 4, locking means 90 is provided for locking and holding individual pipe racks 27 in storage position. Arm 90a is normally positioned in a clockwise direction about pin 91. When arm 53 moves rack 27 to storage position, a pin 93 engages the outer end of arm 90a to move it upwardly until the pin 93 is past the outer end of arm 90a and the arm drops to lock and hold pin 93 and rack 27 in storage position. Locking means 90 thereby holds rack 27 in storage position so that the weight of the rack and any pipe therein is not borne by fluid pressure means 33. Such locking of the pipe racks 27 prevents lowering of the pipe racks 27 until the locking means 90 is actuated by control means (not shown) to release the pipe rack. For example, when fluid pressure means 92 is actuated, arm 90a is pivoted in a clockwise direction about pin 91 to release pin 93 of rack 27. When locking means 90 is released from pin 93, the rack may be lowered by actuation of fluid pressure means 33 by a control means (not shown). Each pipe rack 27 is provided with a pin 93, and individual locking means 90 are provided for each pipe rack. Only one such locking means has been described inasmuch as the other two locking means are identical in structure and function.

Each fluid pressure ram means 33 in the preferred embodiment of the invention comprises a hydraulic cylinder 62a and piston 62 remotely controlled by a control means (not shown) wherein only one pipe rack 27 at a time is lowerable over the drilling axis "C." Further, in the preferred embodiment, a pipe rack is not lowerable to drill attachment position "G" until locking means 90 has been actuated to release pin 93.

For angle drilling the mast is tilted by hydraulic cylinder 38, and the mast 24 is maintained in the tilted position by pins 97 insertable in openings 96 of the mast and openings 95 of arcuate member 21a attached to frame 21.

In operation the drill pipes are initially stored in racks 27. When it is desired to begin drilling, one of the pipe racks 27 must be lowered to drill attachment position by fluid pressure means 33. The other two drill pipes remain in storage position. When upper and lower pipe rack pivot assemblies move the pipe rack 27 to drill attachment position, the drill pipe within the rack is in alignment with the drill hole axis "C" and the axis "D" of the rotary drive means 25. With the drill pipe held in the rack in the drill attachment position, the rotary drive means 25 is lowered by moving chain 36 to turn sprocket 37 in a clockwise direction. When the rotary drive means is lowered to the top of the drill pipe, the drill pipe is coupled at rotary drive coupling 50 (FIGURE 2). When the drill pipe has been coupled by coupling 50, the rotary drive means 25 is then raised to open clamp 70 to allow the pipe rack to be returned to storage position by fluid pressure means 33. When the pipe rack 27 is thus positioned away from the drill hole axis "C," the rotary drive means 25 and attached drill pipe 28 is lowered until the lower portion of the drill pipe engages another drill pipe, drill collar or a drill bit. The drill pipe 28 is then rotated by a rotary drive means 25 to couple with a drill bit, drill collar, or drill pipe, and continued lowering of the rotary drive means and rotation of the drill pipe and drill bit drills the hole.

When the rotary drive means 25 reaches its lowest position adjacent the frame 21, the rotary drive means is disengaged from the drill pipe by holding the drill pipe with wrenches 102. The rotary drive means is then raised to the upper portion of the mast so that another drill pipe 29 or 30 can be brought to drill attachment position by positioning another rack 27. The coupling of rotary drive means to the drill pipe and positioning of the pipe rack to storage is repeated and the drilling continues for the length of the attached drill pipe until it is necessary to attach the remaining drill pipes in the manner hereinabove described.

All positioning of the pipe racks 27, actuation of locking means 90, and actuation of the hydraulic wrenches 102 is accomplished by an operator through a control system (not shown).

Thus a pipe handling apparatus for a rotary blast-hole drilling machine has been described wherein a drill pipe is easily and selectively brought from a storage position on the machine to a location where it can be attached to a drill collar, drill bit, or another drill pipe in the hole. In the preferred embodiment, a plurality of drill pipes are stored in the mast in pipe handling apparatus wherein a selected drill pipe can be brought to the drilling axis for attachment of said pipe. Also in the preferred embodiment, a hydraulic cylinder is provided for positioning each individual pipe rack and drill pipe contained therein. Such pipe handling apparatus is compactly mounted within the drilling mast, and is constructed simply to have only a few moving parts to afford the desired efficiency for adding drill pipe during a drilling operation and for pipe removal. Further, the drilling axis of the machine is immediately forward of the hydraulic jacks supporting the machine during drilling, thereby allowing the machine to drill adjacent cliff edges and the like.

Having now described and illustrated an embodiment of the invention, it is to be understood that the invention is not to be limited to the specific form or arrangement shown and described or specifically covered by the claims.

What is claimed is:

1. In a drilling machine having a main frame, a drill mast carried by said main frame, and drive means carried for longitudinal positioning along said mast and aligned with the drilling axis of said machine, the combination of a drill pipe storage and positioning apparatus comprising: a pipe rack including a socket member adapted to receive and support an end of a drill pipe and means longitudinally spaced from said socket member and adapted to laterally restrain said drill pipe, means pivotally connecting said pipe rack to said mast for movement of said pipe rack in a plane including said drilling axis and with a component of motion parallel to said drilling axis, said pipe rack being movable between a storage position in which said pipe rack is disposed within said mast and an attachment position in which said pipe rack is aligned with said drilling axis and is disposed downwardly of the mast from said storage position for engagement of said drill pipe disposed within said pipe rack by said drive means and removal of said drill pipe or for replacement of a drill pipe in said pipe rack, and means for moving said pipe rack between said storage and attachment positions.

2. A drill pipe storage and positioning apparatus in accordance with claim 1 wherein there are a plurality of said pipe racks each movable between storage and attachment positions in a respective plane including said drilling axis and with a component of motion parallel to said drilling axis, and wherein said planes are angularly spaced and intersect at said drilling axis.

3. In a drilling machine having a main frame, a drill mast carried by said main frame, drill string drive means carried for longitudinal positioning along said mast and aligned with the drilling axis of said machine, and means for securing a drill pipe to a drill bit or another drill pipe to form a drill string at said drilling axis, the combination of a drill pipe storage and positioning apparatus comprising: a pipe rack including a lower socket member adapted to receive and support the lower end of a drill pipe and releasable means spaced above said socket member and adapted to laterally restrain said drill pipe, means pivotally connecting said pipe rack to said mast for movement of said rack in an arc in a plane including said drilling axis, said pipe rack being movable between an elevated storage position in which said pipe rack is disposed within said mast and a lowered attachment position in which said pipe rack is aligned with said drilling axis for engagement of said drill pipe disposed within said rack by said drive means and removal of said drill pipe or for replacement of said drill pipe in said pipe rack, guide means on the underside of said socket member adapted to engage with a drill bit or drill pipe of the drill string when said pipe rack is in said attachment position so that the weight of said pipe rack and drill pipe disposed therein is borne by the drill string, and means connected to said mast for moving said pipe rack between said storage and attachment positions.

4. In a drilling machine having a main frame, a drill mast carried by said main frame, and drive means carried for longitudinal positioning along the said mast and aligned with the drilling axis of said machine, the combination of a drill pipe storage and positioning apparatus comprising: a first arm pivotally supported on said mast, a second arm pivotally supported on said mast and spaced from said first arm, a pipe rack pivotally carried by said first and second arms, said pipe rack including a socket member and restraining means spaced longitudinally from said socket member, said pipe rack being adapted to carry a drill pipe having an end resting in said socket member and said drill pipe being laterally restrained by said restraining means, and power means interconnecting said mast and one of said arms to move said rack in an arc in a plane including said drilling axis and with a component of motion parallel to said drilling axis between a storage position in which said rack is disposed within said mast out of the path of travel of said drive means and an attachment position in which said rack is disposed downwardly of the mast from said storage position, said first and second arms being so proportioned and located on said mast as to align said rack with said drilling axis when said rack has been moved to said attachment position, said pipe rack being adapted to receive a drill pipe when in said attachment position and to remove said drill pipe from said drilling axis by movement of said rack to said storage position, and said pipe rack being adapted to deliver a drill pipe to said drilling axis by movement to said attachment position for engagement by said drive means whereby said drill pipe may be withdrawn from said rack for subsequent attachment to a drill bit, drill collar, or another drill pipe.

5. In a drilling machine having a main frame, a drill mast carried by said main frame, drill string drive means carried for longitudinal positioning along said mast and aligned with the drilling axis of said machine, and means for securing a drill pipe to a drill bit or another drill pipe to form a drill string at said drilling axis, the combination of a drill pipe storage and positioning apparatus comprising: a plurality of pipe racks each including a lower socket member adapted to receive and support the lower end of a drill pipe and an upper releasable pipe clamp adapted to laterally restrain the drill pipe, means operably connecting said socket member and said pipe clamp to close said clamp when a drill pipe is inserted in said socket member and to release said clamp when the drill pipe is lifted from said socket member, spaced upper and lower arms for each pipe rack pivotally connecting each pipe rack and said mast for movement of each pipe rack in an arc in a plane including said drilling axis, each pipe rack being movable between an elevated storage position in which said pipe rack is disposed within said mast and a lowered attachment position in which said pipe rack is aligned with said drilling axis, the planes of movement of said pipe racks being angularly spaced and intersecting at said drilling axis, guide means on the underside of each socket member adapted to engage with a drill bit or drill pipe of the drill string to have the drill string support a respective pipe rack when said pipe rack is in said attachment position, and power means interconnecting said mast and one of said arms for moving a respective pipe rack between its storage and attachment positions.

References Cited by the Examiner

UNITED STATES PATENTS

| | | | |
|---|---|---|---|
| 1,162,144 | 11/15 | Donze et al. | 214—2.5 |
| 2,108,057 | 2/38 | Elmes | 214—2.5 |
| 2,416,815 | 3/57 | Calhoun | 214—2.5 |
| 3,025,918 | 3/62 | Leven | 175—85 |
| 3,061,011 | 10/62 | Paget | 175—85 |

BENJAMIN HERSH, *Primary Examiner.*